US006173334B1

United States Patent
Matsuzaki et al.

(10) Patent No.: US 6,173,334 B1
(45) Date of Patent: Jan. 9, 2001

(54) NETWORK SYSTEM INCLUDING A PLURALITY OF LAN SYSTEMS AND AN INTERMEDIATE NETWORK HAVING INDEPENDENT ADDRESS SCHEMES

(75) Inventors: Takanori Matsuzaki, Hiratsuka; Hiroshi Sakurai, Kawasaki, both of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/166,860

(22) Filed: Oct. 6, 1998

(30) Foreign Application Priority Data

Oct. 8, 1997 (JP) .................................................. 9-275519

(51) Int. Cl.⁷ .................................................. G06F 13/00
(52) U.S. Cl. ........................... 709/245; 709/223; 709/230
(58) Field of Search ................................ 709/217, 218, 709/220, 223, 230, 245, 250, 311

(56) References Cited

U.S. PATENT DOCUMENTS

| 5,636,216 | * | 6/1997 | Fox et al. ............................. 370/402 |
| 5,737,333 | * | 4/1998 | Civanlar et al. ..................... 370/352 |
| 5,799,016 | * | 8/1998 | Onweller .............................. 370/401 |
| 5,856,974 | * | 1/1999 | Gervais et al. ...................... 370/392 |

FOREIGN PATENT DOCUMENTS 6-209323 * 7/1994 (JP) .

* cited by examiner

Primary Examiner—Viet D. Vu
(74) Attorney, Agent, or Firm—Antonelli, Terry, Stout & Kraus, LLP (57) ABSTRACT

A network system is constructed by: a first LAN system having first terminal equipment; a second LAN system having second terminal equipment; an intermediate network to connect the first and second LAN systems; first communication equipment to transfer a packet between the first LAN system and the intermediate network; and second communication equipment to transfer a packet between the second LAN system and the intermediate network. To transfer the packet from the first terminal equipment to the second terminal equipment, the first communication equipment converts an address showing a transmission destination of the packet transmitted from the first terminal equipment from an address defined on the first LAN system to an address defined on the intermediate network and transfers the converted address from the first LAN system to the intermediate network. The second communication equipment converts an address showing the transmission destination of the packet on the intermediate network from the address defined on the intermediate network to an address defined on the second LAN system and transfers the converted address from the intermediate network to the second LAN system.

10 Claims, 5 Drawing Sheets

| LAN | ADDRESS SCHEMA IN LAN SYSTEM | ADDRESS SCHEMA OF INTERMEDIATE NETWORK |
|---|---|---|
| A | 172.17.XXX.XXX | 10.128.XXX.XXX |
| B | 172.18.XXX.XXX | 10.129.XXX.XXX |
| C | 172.19.XXX.XXX | 10.130.XXX.XXX |
| D | 172.20.XXX.XXX | 10.131.XXX.XXX |

FIG.5

NETWORK SYSTEM INCLUDING A PLURALITY OF LAN SYSTEMS AND AN INTERMEDIATE NETWORK HAVING INDEPENDENT ADDRESS SCHEMES

BACKGROUND OF THE INVENTION

The invention relates to a network system which mutually connects a plurality of LAN (Local Area Network) systems and relates to a connecting method among the LAN systems for such a purpose. More particularly, the invention relates to a network system which mutually connects a plurality of LAN systems having independent address schemas and relates to a connecting method among the LAN systems for such a purpose.

In a network system such as Internet, Intranet, or the like, a network protocol called TCP/IP is generally used. In the TCP/IP, by using IP addresses (Internet Protocol Addresses) in order to identify individual terminals which are connected onto the network, the mutual connection is realized. In the Internet, the addresses called global addresses which are allocated from JPNIC (Japan Network Information Center) and have uniquely set in the whole world are used as such IP addresses. In the LAN system closed in a certain organization such as a company or the like, the use of the global addresses which are allocated from the JPNIC is difficult because the problem of limitation of the number of addresses. In such an LAN system, therefore, addresses of terminals which are connected to the LAN system are set so as to be unique in the system in accordance with an address schema which was uniquely decided, a system of private addresses determined by the RFC (Request For Comment) standardized by the IETF (Internet Engineering Task Force), or the like.

Hitherto, generally, the LAN system in an organization constructed by using a network protocol such as TCP/IP or the like has been used only for the purpose of connection among the terminals in the organization. However, the access to the WWW server in association with the internet or the LAN connection through the internet or a dedicated line has spread and not only the connection among the terminals in the LAN system but also the mutual connection from a terminal of a self-sustaining LAN system to a terminal of another LAN system is increasing. As mentioned above, in the case where a terminal in a LAN system using a self address schema or a private address schema according to the RFC for the LAN system is connected to a terminal of another LAN system, usually, data on the LAN is capsulated by a global address of the internet and is transferred to the LAN system on the partner side, thereby realizing a mutual connection. Such a mutual connecting system of the LAN systems is generally called VPN (Virtual Private Network). Although the connection over the Internet is performed by the global addresses, addresses of terminals which are connected to each of the LAN systems which are mutually connected need to be uniquely determined in accordance with the same address schema. In many case, therefore, the connection among the LAN systems as mentioned above is limited to a connection among the LAN systems which are managed by the same organization.

In the case where the LAN systems which have already been used by different organizations, for instance, by enterprises A and B are mutually connected by the dedicated line or Internet, the address schemas are revised so that the addresses which are allocated to terminals which are connected to both of the LAN systems do not overlap in consideration of the address schemas which are used in the LAN systems, and if the uniqueness of the addresses is assured, the mutual connection of those LAN systems can be realized.

For example, in JP-A-6-209323, there has been disclosed a communication system such that in the case where the LAN systems constructed by different address schemas are connected by an intermediate apparatus, all of the LANs which are connected to the intermediate apparatus are regarded as one network without changing the address schemas of the LAN systems, an address schema of the whole network in which the addresses become unique is set, a mapping among the address schemas of the individual LAN systems and the address schema of the whole network is performed, and they are mutually connected.

SUMMARY OF THE INVENTION

As mentioned above, if the address schemas are revised or a fire wall is used in order to mutually connect LAN systems constructed by a unique address schema or a private address schema decided by the RFC, problems such that the number of works for revising addresses increases and much costs and long time are required for construction occur.

In the technique as disclosed in JP-A-6-209323, nothing is considered with respect to a communication among LAN systems by an intermediate network. Even if communication is performed via a communication equipment, in order to newly set an address schema of the whole network in which all of the LAN systems are regarded as one network into each LAN system, work for each LAN system to manage the double address schema is necessary. Further, in the case where the individual LAN systems are constructed by different organizations, there is also a problem such that works for performing an adjustment among those organizations and deciding an address schema of the whole network are needed, so that it is difficult to realize the mutual connection.

It is an object of the invention to enable a mutual connection among LAN systems to be performed without changing the conventional LAN systems. According to another aspect, it is an object of the invention to make it unnecessary to perform works to revise addresses in LAN systems, to decide an address schema as a whole network, and the like, thereby reducing the costs and the number of days for the revising work.

To accomplish the above object, according to the invention, there is provided a network system comprising: a first LAN system having a first terminal equipment; a second LAN system having a second terminal equipment; an intermediate network for connecting the first and second LAN systems; a first communication equipment for transferring a packet between the first LAN system and the intermediate network; and a second communication equipment for transferring a packet between the second LAN system and the intermediate network. The first communication equipment converts an address showing a transmission destination of the packet transmitted from the first terminal equipment toward the second terminal equipment from an address defined on the first LAN system to an address defined on the intermediate network and transfers the converted address from the first LAN system to the intermediate network. The second communication equipment converts an address showing the transmission destination of the packet on the intermediate network from the address defined on the intermediate network to an address defined on the second LAN system and transfers the converted address from the intermediate network to the second LAN system.

According to another aspect of the invention, there is provided a network system comprising: a first LAN system constructed by mutually connecting a plurality of terminal equipments; a second LAN system constructed by mutually connecting a plurality of terminal equipments; an intermediate network provided between the first LAN system and the second LAN system; a first intermediate apparatus for transferring data between the first LAN system and the intermediate network; and a second intermediate apparatus for transferring data between the second LAN system and the intermediate network. The first intermediate apparatus has address mapping information for making addresses of terminal equipment of the first and second LAN systems defined on the first LAN system correspond to addresses of terminal equipment of the first and second LAN systems defined on the intermediate network. The second intermediate apparatus has address mapping information for making addresses of terminal equipment of the first and second LAN systems defined on the second LAN system correspond to the addresses of the terminal equipment of the first and second LAN systems defined on the intermediate network.

According to a preferred embodiment of the invention, the first intermediate apparatus comprises: a first communication equipment which is connected to the first LAN system; and a second communication equipment which is connected to the first communication equipment and the intermediate network. The second intermediate equipment comprises: a third communication equipment which is connected to the second LAN system; and a fourth communication equipment which is connected to the third communication equipment and the intermediate network.

DESCRIPTION OF THE PREFERRED EMBODIMENT

Figure 1:
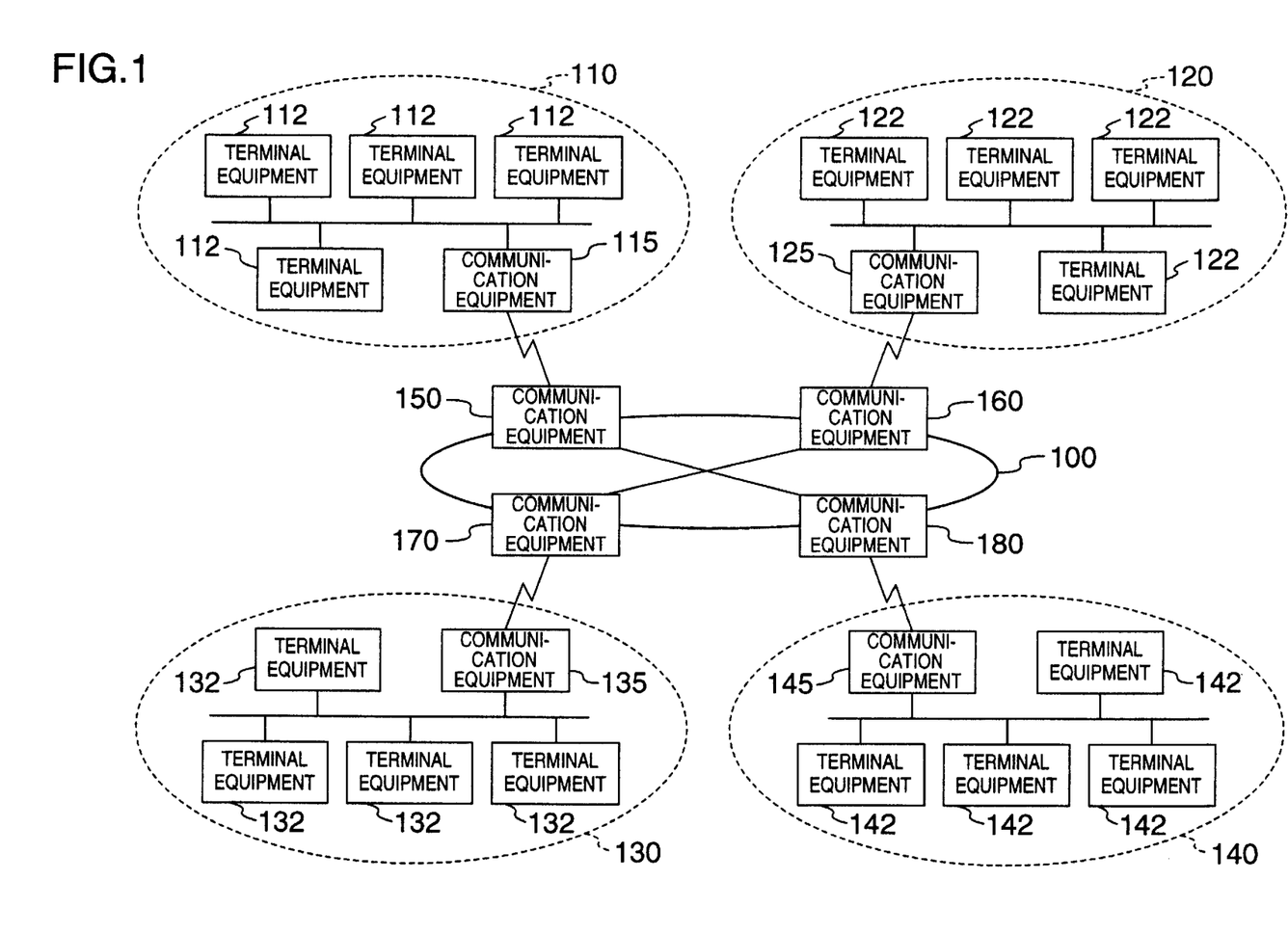
FIG. 1 is a block diagram showing an embodiment of a network system to which the invention is applied.

FIG. 1 is a constructional diagram of a network system in an embodiment in the invention. As shown in FIG. 1, in the embodiment, a plurality of LAN systems (a LAN system 110, a LAN system 120, a LAN system 130, a LAN system 140) are mutually connected by an intermediate network 100. The LAN system 110 is constructed by including a plurality of terminal equipments 112 and a communication equipment 115 which are mutually connected in the system. The LAN systems 120, 130, and 140 also include similar terminal equipments 122, 132, and 142 and communication equipments 125, 135, and 145, respectively. The intermediate network 100 is a network such as a dedicated line, or the like serving as an interface for mutually connecting the LAN systems 110, 120, 130, and 140. The communication equipments 115, 125, 135, and 145 are connected to the LAN systems 110, 120, 130, and 140, respectively. Communication equipment 150, 160, 170, and 180 are connected to the intermediate network. The communication equipment 115 is connected to the communication equipment 150. Each of the terminal equipment 112 in the LAN system 110 is connected to the intermediate network 100 via the communication equipment 115 and 150. The communication equipment 125 is connected to the communication equipment 160. Each of the terminal equipment 122 in the LAN system 120 is connected to the intermediate network 100 via the communication equipment 125 and 160. The communication equipment 135 is connected to the communication equipment 170. Each of the terminal equipment 132 in the LAN system 130 is connected to the intermediate network 100 via the communication equipment 135 and 170. Similarly, the communication equipment 145 is connected to the communication equipment 180. Each of the terminal equipment 142 in the LAN system 140 is connected to the intermediate network 100 via the communication equipment 145 and 180.

In the embodiment, "172.17.XXX.XXX" is allocated as an IP address to the terminal equipment 112 in the LAN system 110. In the LAN system 110, the mutual connection among the terminal equipment is realized by using the IP address. "172.20.XXX.XXX" is allocated as an IP address to the terminal equipment 122 in the LAN system 120. In the LAN system 120, the mutual connection among the terminal equipment is realized by using the IP address. IP addresses are also similarly set in the LAN system 130 and LAN system 140, respectively. Those IP addresses can be independently set in each LAN system. Therefore, if there are addresses which were used before the mutual connection to the other LAN system is performed, these addresses can be used as they are. "XXX.XXX" shows an arbitrary numerical value and indicates a host address to identify the terminal equipment which is connected to each LAN system. Such a numerical value is set so as to be unique in each of the LAN systems. Head eight bits (for instance, "172." of the address schema in the LAN systems 110 and 120) indicate a private address schema according to the IETF standard.

Each of the LAN systems uses an IP address in an area which is not used in the self LAN system in order to mutually connect to another LAN system and defines the IP address while guaranteeing the uniqueness of the IP address of the terminal equipment of the other LAN system. In the embodiment, in the LAN system 110, IP addresses of the terminal equipment in the LAN systems 120, 130, and 140 are defined as "172.18.XXX.XXX", "172.19.XXX.XXX", and "172.20.XXX.XXX", respectively. As lower values (portion shown by "XXX.XXX": host address) of the IP address, a host address set in the terminal equipment in each LAN system is used. As for an upper portion (network address) of the IP address which is commonly set to each terminal equipment in the LAN systems, it is independently defined in the LAN system 110. When connecting to the terminal equipment belonging to the other LAN system, the terminal equipment 112 belonging to the LAN system 110 uses the IP address defined in the LAN system 110. Even in the LAN system 120, the IP addresses of the terminal equipment in the other LAN systems 110, 130, and 140 are also similarly defined as "172.21.XXX.XXX", "172.22.XXX.XXX", and "172.23.XXX.XXX", respectively. Further, in the LAN systems 130 and 140 as well, the addresses of the other LAN systems are defined. Thus, the IP addresses of the terminal equipment of the other LAN systems when they are seen from the LAN system 110 are virtually defined without changing the address schema which has conventionally been used in the LAN system 110.

On the intermediate network 100, the IP address of the terminal equipment of each LAN system which is connected to the network 100 is uniquely defined on the intermediate network 100 independently of the definition on each network. In the embodiment, on the intermediate network 100, the IP addresses are allocated in a manner such that "10.128.XXX.XXX" is allocated for the terminal equipment 112 in the LAN system 110, "10.129.XXX.XXX" is allocated for the terminal equipment 122 in the LAN system 120, "10.130.XXX.XXX" is allocated for the terminal equipment 132 in the LAN system 130, and "10.131.XXX.XXX" is allocated for the terminal equipment 142 in the LAN system 140, respectively.

In case of mutually transmitting data among the terminal equipments belonging to the different LAN systems, the terminal equipment transmits the data by using the IP address which is defined on the LAN system to which the self terminal equipment belongs. The IP address used here is mapped to the IP address which is defined on the intermediate network 100 when the data is transmitted to the intermediate network 100 from the LAN system to which the terminal equipment on the transmission side belongs. Further, when the data is transmitted from the intermediate network 100 to the LAN system to which the terminal equipment on the reception side belongs, the IP address is mapped from the address schema on the intermediate network 100 to the IP address defined in the LAN system to which the terminal equipment on the reception side belongs. The terminal equipment of the partner side receives the data on the basis of the address defined on the LAN system to which the self LAN system belongs. In the embodiment, the mapping of the IP address between the LAN system and the intermediate network 100 is performed in the communication equipments 150, 160, 170, and 180 on the intermediate network. The mapping of the IP address is not necessarily performed in the communication equipment 150, 160, 170, and 180 on the intermediate network side but can be also executed in the communication equipment 115, 125, 135, and 145 on each LAN system side.

Figure 2:
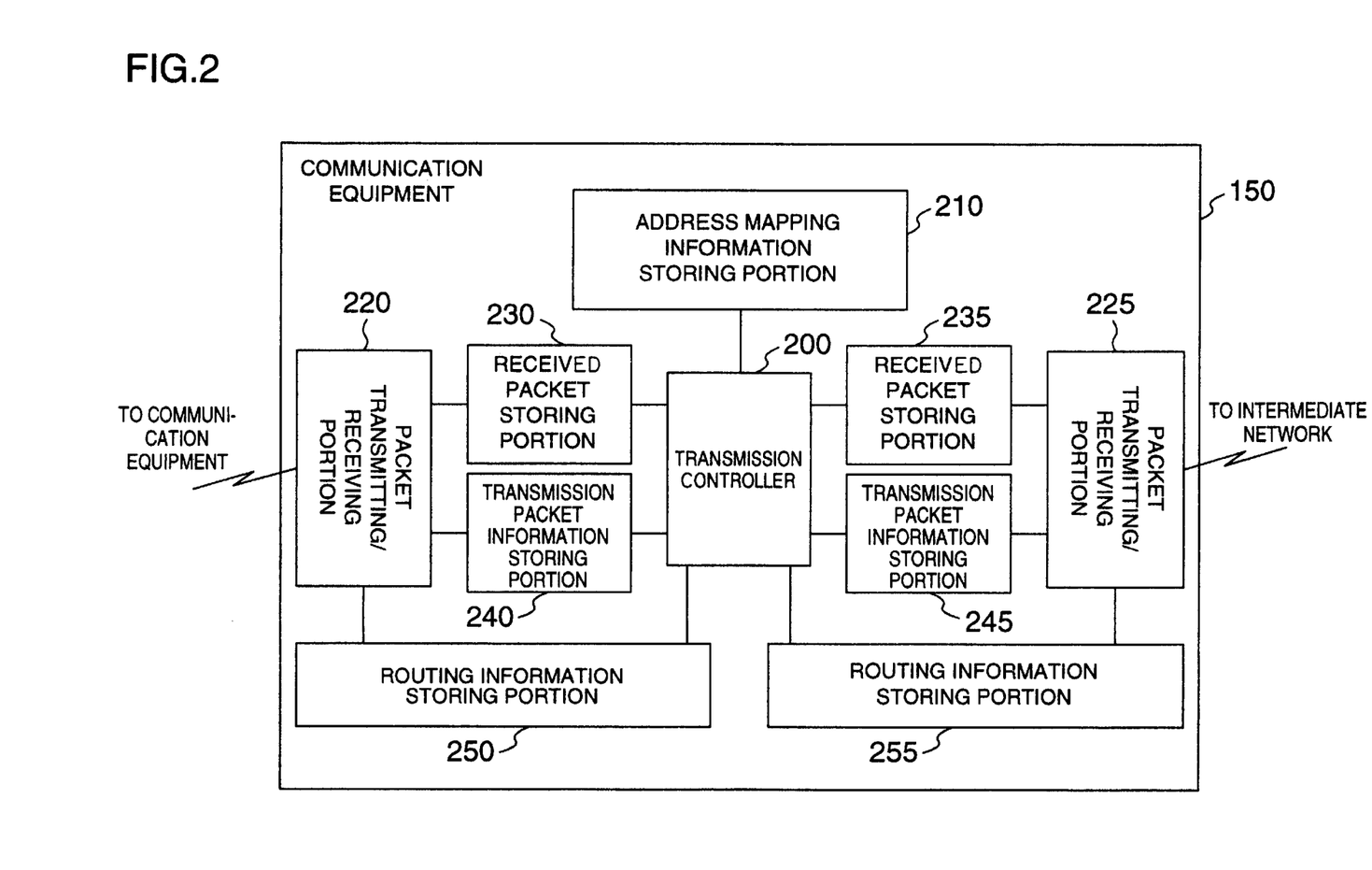
FIG. 2 is a constructional diagram of communication equipment.

FIG. 2 is a constructional diagram of communication equipment which is provided on the intermediate network in order to connect the LAN system and the intermediate network. The communication equipment is generally an apparatus such as a router or the like. Explanation will now be made with respect to the communication equipment 150 as an example. As shown in FIG. 2, the communication equipment 150 comprises: a transmission controller 200 to perform an address conversion of a packet; packet transmitting/receiving portions 220 and 225 to perform transmission and reception of packet data; received packet storing portions 230 and 235 to temporarily accumulate the received packet information; transmission packet storing portions 240 and 245 to temporarily accumulate packet information to be transmitted; routing information storing portions 250 and 255 in which routing information has been stored; and an address mapping information storing portion 210 to store address mapping information. The address mapping information which is stored in the address mapping information storing portion 210 makes the IP address of the terminal equipment of each LAN system defined in the LAN system 110 correspond to the IP address of the terminal equipment of each LAN system defined in the intermediate network 100.

The packet information transferred to the communication equipment 150 is received by the packet transmitting/receiving portions 220 and 225 and is sequentially accumulated into the received packet storing portions 230 and 235. The transmission controller 200 sequentially extracts the packet information accumulated in the received packet storing portions 230 and 235 and converts the IP address of the terminal equipment on the transmission destination and transmitting source included in the packet information by using the address mapping information stored in the address mapping information storing portion 210. The packet information in which the IP address was converted is accumulated into the transmission packet storing portions 245 and 240 by the transmission controller 200. The packet information stored in the transmission packet storing portions 245 and 240 is transferred to another communication equipment or terminal equipment by the packet transmitting/receiving portions 225 and 220. In this instance, the packet transmitting/receiving portions 225 and 250 discriminate the transfer destination of the packet information on the basis of routing information stored in the routing information storing portions 255 and 250.

Figure 3:
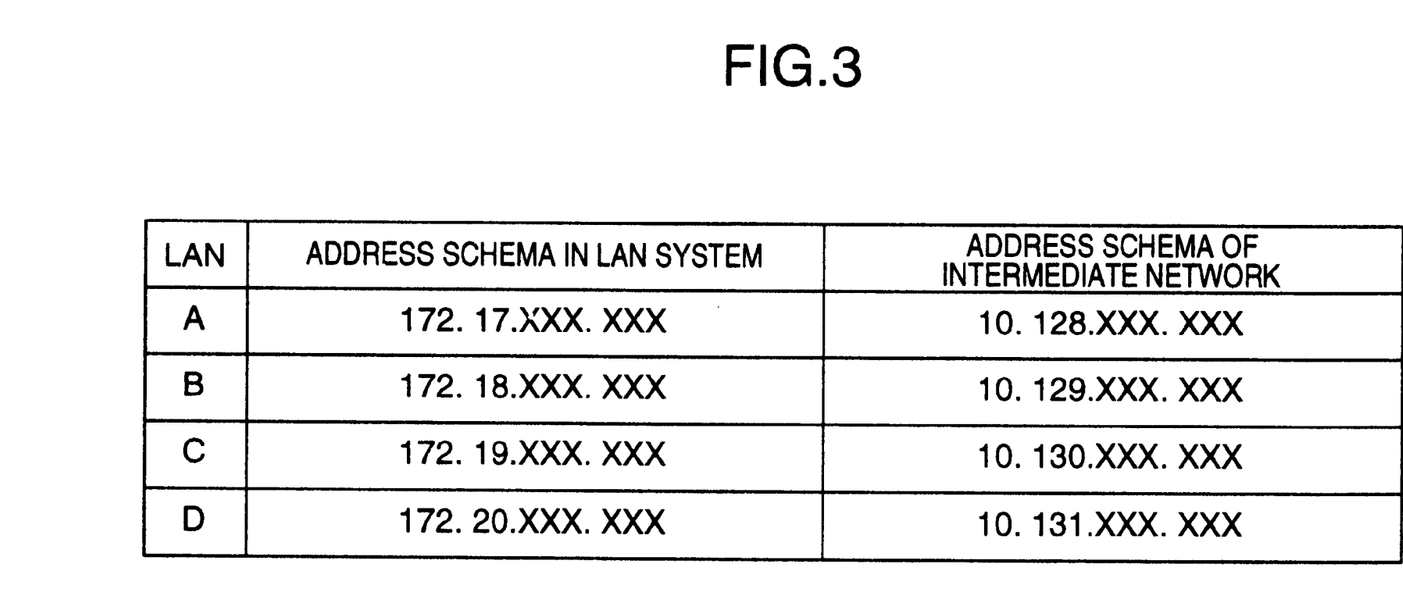
FIG. 3 is a table constructional diagram showing an example of a construction of address mapping information.

FIG. 3 shows an example of the address mapping information which is stored in the address mapping information storing portion 210 of the communication equipment 150. As shown in the diagram, the address mapping information storing portion 210 stores the address schema of each LAN system defined in the LAN system 110 and the address schema of each LAN system on the intermediate network 100 in correspondence to each other. In the diagram, as information which is stored into the address mapping information storing portion 210, the host address portion of the IP address to identify each terminal equipment is set to "XXX.XXX" and the whole addresses are held so as to understand that this address portion can have an arbitrary value. However, it is also possible to construct in a manner such that the host address portion of the IP address to identify each terminal equipment is not included and only the information of the network address portion that is peculiar to the LAN system is held.

Although the communication equipment 150 has been described above, the other communication equipment 160, 170, and 180 are also similarly constructed. The mapping information which is stored in the address mapping information storing portion 210 of each communication equipment is information to make the address schema on the LAN system which is connected by the communication equipment correspond to the address schema on the intermediate network in a manner similar to that shown in FIG. 3. That is, the mapping information which is held in the communication equipment 160 is information to make the address schema of each LAN system defined on the LAN system 120 correspond to the address schema of each LAN system defined on the intermediate network 100. Similarly, the mapping information which is held in the communication equipment 170 and 180 is information to make the address schema on the LAN system 130 and the address schema on the LAN system 140 correspond to the address schema defined on the intermediate network 100. In the subsequent description, component portions of each communication equipment will be described by using the same reference numerals as those used in the above explanation.

To transfer the packet, each communication equipment has to know a position where a subnetwork exists. For this purpose, it is necessary to exchange the routing information between the communication equipment. The exchange of the routing information between the communication equipment can be realized by using a routing protocol such as OSPF or RIP. The routing information specified by the OSPF or RIP exchanges the network addresses and constructs routing tables in the communication equipment. The routing tables are held in the routing information storing portions 250 and 255. When an address of the LAN system is equal to "172.17.XXX.XXX", in order to divide the LAN system to the subnetworks, a subnetwork masking technique is used. For example, "172.21.XXX.XXX" can be set to the network address and a length of network address can be freely specified. In the embodiment, explanation will be made on the assumption that the RIP is used as a information protocol and data in a range of upper three bytes is used as a network address which is exchanged between routers.

Since an apparatus such as a router or the like which is conventionally generally been used can be used as it is for the communication equipment 115, 125, 135, and 145 which are provided on each LAN system, the detailed description about them is omitted here. In the communication equipment 115, 125, 135, and 145, it is defined in accordance with the address schema defined on each LAN system in a manner such that the packets to the LAN systems other than the LAN system to which the self communication equipment belongs are transferred to the communication equipment 150, 160, 170, and 180 on the intermediate network 100.

A procedure for exchanging the routing information between the communication equipment and constructing routing information will now be briefly described hereinbelow.

The communication equipment 115 exchanges the necessary routing information in accordance with the address schemas "172.17.XXX.XXX", "172.18.XXX.XXX", "172.19.XXX.XXX", and "172.20.XXX.XXX" defined on the LAN system 110. The communication equipment 115 constructs routing information by using the network address of the LAN system 110 to which the self communication equipment is connected and sends the RIP packet to the communication equipment 150. In the communication equipment 150, the received RIP packet is received by the packet transmitting/receiving portion 220 and stored into the received packet storing portion 230. In the communication equipment 150, it is assumed that the packet transmitting/receiving portion 220 of the communication equipment 150 connects to the communication equipment 115 of the LAN system 110 and the packet transmitting/receiving portion 225 of the communication equipment 150 serves as an intermediate network 100 side.

The transmission controller 200 of the communication equipment 150 sequentially extracts the received RIP packets from the received packet storing portion 230, constructs a routing table from the information included in the RIP packets, and stores it into the routing information storing portion 250. Subsequently, the network address in the RIP packet is converted on the basis of the address mapping information stored in the address mapping information storing portion 210. As a network address which is necessary for the RIP, upper several bits are used by the subnetwork masking instead of all digits of the IP address. Therefore, when the address conversion is performed, the address corresponding to the network address in the received RIP packet is retrieved from the address mapping information by seeing only the digit number according to the subnetwork mask length. The conversion is executed by using the data as much as the subnetwork mask length of the corresponding address. Subsequently, the transmission controller 200 of the communication equipment 150 constructs a routing table from the information in the converted RIP packet, stores it into the routing information storing portion 255, and accumulates the RIP packet into the transmission packet storing portion 245. After that, the packet transmitting/receiving portion 225 transmits the packet to the intermediate network 100. On the contrary, the RIP packet which is sent from the intermediate network 100 side to the communication equipment 150 is received by the packet transmitting/receiving portion 225 and is once stored into the received packet storing portion 235. The transmission controller 200 successively extracts the RIP packets from the received packet storing portion 235. The transmission controller 200 constructs a routing table on the basis of the information in the extracted RIP packets and stores into the routing information storing portion 255. In a manner similar to the reception of the packet from the communication equipment 150 mentioned above, subsequently, on the basis of the address mapping information stored in the address mapping information storing portion 210, the network address in the RIP packet is converted. The transmission controller 200 constructs a routing table from the information in the converted RIP packet, stores it into the routing information storing portion 250, and accumulates the RIP packet into the transmission packet storing portion 240. After that, the packet transmitting/receiving portion 220 transmits the packet to the communication equipment 115 of the LAN system 110.

As mentioned above, the routing table is constructed in the routing information storing portion 250 by the address schema determined by the LAN system 110 and the routing table is constructed in the routing information storing portion 255 by the address schema determined on the intermediate network side. Similarly, routing information is also constructed in the communication equipment 160, 170, and 180 while performing the address conversion. In the communication equipment 115, 125, 135, and 145, routing information is constructed by an ordinary system in accordance with the network address schema of the LAN system which is connected by each communication equipment, respectively. Even in the routing information exchange using the OSPF as a routing protocol, by constructing routing tables in a manner similar to the case of the RIP, the data exchange can be performed. Between the communication equipment on the LAN system and the communication equipment on the intermediate network side such as between the communication equipment 115 and communication equipment 150, even by a static routing system instead of the system such as RIP or OSPF, the communication equipment on the intermediate network side has different routing tables on the LAN system side and the intermediate network side as shown in FIG. 2, so that the data transfer can be performed in accordance with the routing information without causing any problem. In case of the static routing, however, it is necessary to manually previously define the routing table on the static side.

Figure 4:
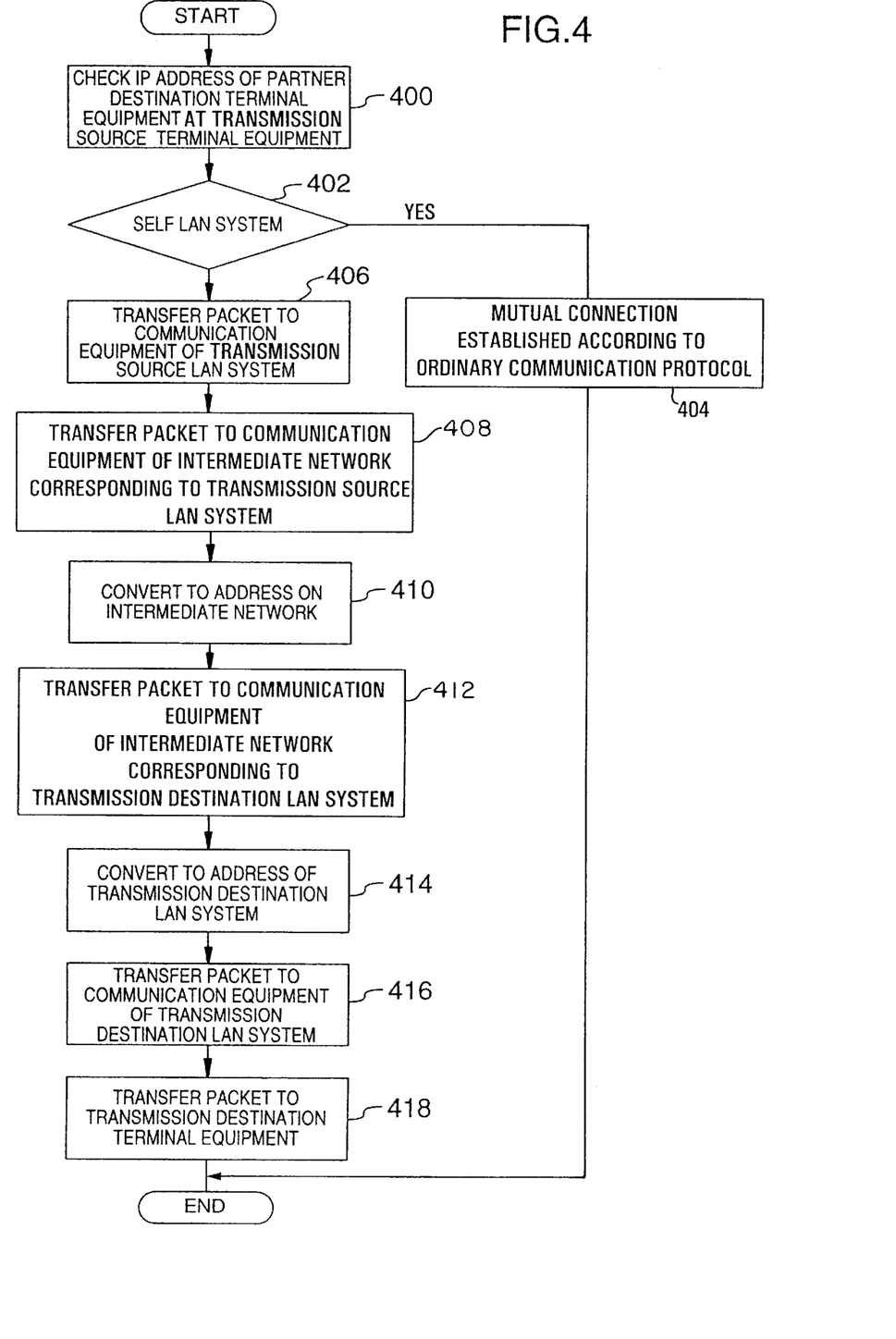
FIG. 4 is a flowchart showing a procedure for processes when data is transmitted between terminal equipment.

FIG. 4 is a flowchart showing a procedure for processes when the data transmission is performed between the terminal equipment in the embodiment.

The terminal equipment checks the network number of the IP address of the terminal equipment of the partner destination to be communicated (step 400), thereby discriminating whether the terminal equipment of the partner destination is the terminal equipment of in the self LAN system or the terminal equipment of the other LAN system. For example, in case of the terminal equipment 112 belonging to the LAN system 110, the network number of the self LAN system is equal to "17". When the network number of the IP address of the terminal equipment of the partner destination is equal to "18" (network number of the IP address allocated to the LAN system 120 in the LAN system 110), it is decided that the terminal equipment of the partner destination is the terminal equipment of the other LAN system. On the other hand, if the network number of the IP address of the terminal equipment of the partner destination is equal to the network number "17" of the self LAN system, it is determined that the terminal equipment of the partner destination is the terminal equipment in the self LAN system (step 402). If the terminal equipment of the partner destination exists in the self LAN system, a mutual connection between the terminal equipment and the terminal equipment of the partner destination is established and a communication is executed in accordance with the communication protocol of the ordinary TCP/IP (step 404). When it is determined in step 402 that the terminal equipment of the partner destination is the terminal equipment of the other LAN system, the terminal equipment transfers the packet to perform the communication to the communication equipment on the self LAN system (step 406).

When the packet from the terminal equipment is received, the communication equipment of the LAN system of the transmission source determines on the basis of a destination address of the packet that the packet should be transferred to an external LAN system, so that it transfers the packet to the communication equipment of the intermediate network (step 408).

The communication equipment of the intermediate network which received the packet from the LAN system converts the IP address of the terminal equipment of the transmission source set in the packet and the IP address of the terminal equipment of the partner destination to the address on the intermediate network on the basis of the address mapping information stored in the address mapping information storing portion 210 by the transmission controller 200 (step 410). The communication equipment transmits the packet onto the intermediate network on the basis of the IP address of the terminal equipment of the transmission destination after completion of the conversion with reference to the routing information stored in the routing information storing portion. On the intermediate network, the packet is transferred on the basis of the IP address after the conversion and is sent to the communication equipment on the intermediate network connected to the communication equipment on the LAN system to which the terminal equipment of the transmission destination belongs (step 412).

When the packet is received, the communication equipment on the intermediate network connected to the communication equipment on the LAN system to which the terminal equipment of the transmission destination belongs converts the IP address of the terminal equipment of the transmitting source set in the packet and the IP address of the terminal equipment of the transmission destination from the address on the intermediate network to the IP address on the LAN system to which the terminal equipment of the transmission destination belongs on the basis of the address mapping information stored in the address mapping information storing portion 210 (step 414). After that, the packet is transferred to the communication equipment of the LAN system of the transmission destination (step 416).

The communication equipment of the LAN system of the transmission destination decides that the network number shown by the IP address of the terminal equipment of the transmission destination indicates the self LAN system, and transmits the received packet to the terminal equipment which is identified by the IP address (step 418). To return a reply in accordance with the communication protocol, the terminal equipment which received the packet forms a packet in which the transmission destination address and the transmitting source address in the packet are reversed and returns it to the terminal equipment which has transmitted the packet before. The transmitted packet is returned to the terminal equipment which has transmitted the packet before by a procedure similar to the foregoing procedure.

Figure 5:
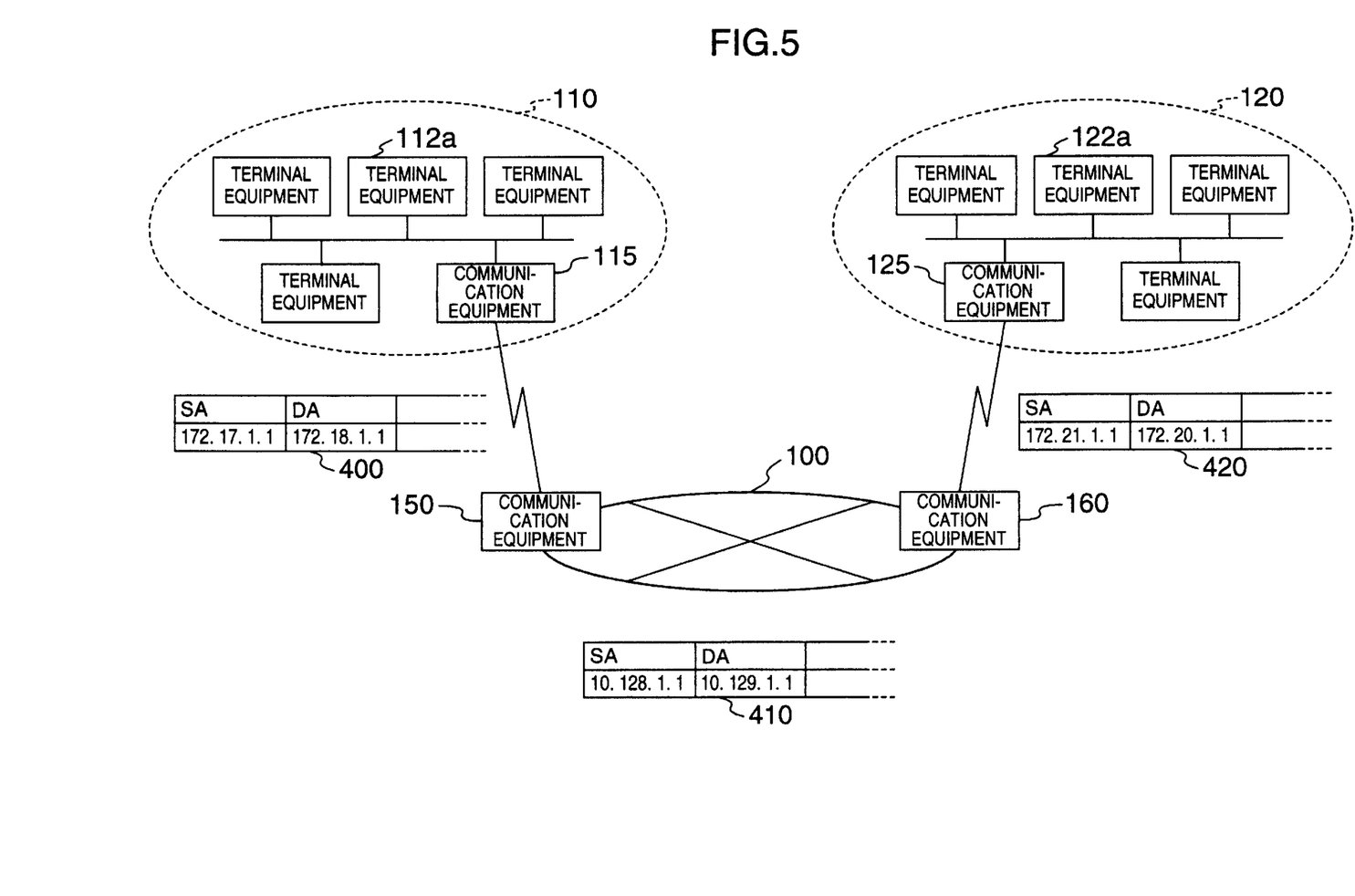
FIG. 5 is a diagram showing a state of transmission of packets.

FIG. 5 is a schematic diagram showing a state where the packet is transmitted by the foregoing procedure. In FIG. 5, a case of transferring data from terminal equipment 112a of the LAN system 110 to terminal equipment 122a of the LAN system 120 is shown as an example of the transmission of the packet. It is now assumed that the following contents have been set with respect to addresses. In each LAN system, "172.17.1.1" is allocated as an IP address into the terminal equipment 112a and "172.20.11" is allocated as an IP address into the terminal equipment 122a. The address of the terminal equipment of the LAN system 120 is defined as "172.18.XXX.XXX" in the LAN system 110. The address of the terminal equipment of the LAN system 110 is defined as "172.21.XXX.XXX" in the LAN system 120. In the intermediate network 100, the terminal equipment of the LAN system 110 and LAN system 120 are defined as "10.128.XXX.XXX" and "10.129.XXX.XXX", respectively.

Reference numerals 400, 410, and 420 show packets which are transmitted. Each packet includes the IP address (Destination Address: DA) of the terminal equipment of the transmission destination and an IP address (Sender Address: SA) of the terminal equipment of the transmitting source as control information. In case of connecting from the communication equipment 112a to the communication equipment 122a, the communication equipment 112a forms the packet 400 in which the IP address "172.18.1.1" of the virtual terminal equipment 122a in the LAN system 110 which is connected by the self communication equipment is set to DA and the self IP address "172.17.1.1" is set to SA. The formed packet 400 is transmitted to the communication equipment 115 by using a function of a default route in the connecting system by the ordinary TCP/IP. The communication equipment 115 receives the packet 400 and transfers the packet 400 to the communication equipment 150 of the intermediate network 100 on the basis of the network address of "172.18" of DA.

The communication equipment 150 converts the DA and SA of the received packet 400 into the address schema on the intermediate network, namely, "10.129.1.1" and "10.128.1.1" on the basis of the address mapping information and transmits the packet 410 on the basis of the DA after the conversion. The packet 410 is transferred on the intermediate network 100 on the basis of the DA after the conversion and is sent to the communication equipment 160. From the network address of "10.129" of the DA of the packet 410, the communication equipment 160 determines that the packet 410 is a packet to the terminal in the LAN system 120. In a manner similar to the communication equipment 150, on the basis of the address mapping information, the communication equipment 160 converts the DA and SA of the packet 410 into "172.20.1.1" and "172.21.1.1" according to the address schema of the LAN system 120. The communication equipment 160 transfers the packet 420 after completion of the address conversion to the communication equipment 125 on the LAN system 120. The communication equipment 125 which received the packet 420 transmits the packet 420 onto the LAN system 120 toward the terminal equipment 122a. The packet 420 is finally received by the communication equipment 122a.

In the embodiment, the mutual connection between the terminal equipment 112a and terminal equipment 122a is realized as mentioned above.

According to the embodiment described above, in case of newly mutually connecting the existing LAN systems, the address group of the terminal equipment of the LAN system of the connection destination in each LAN system to be mutually connected are determined so as to be unique in the self LAN system. Further, the addresses of the terminal equipment of each LAN system on the intermediate network are determined so as to be unique on the intermediate network. Mapping information between the address schema on the intermediate network and the address schema on the LAN system to be connected is set into the communication equipment to connect each LAN system and the intermediate network. In each LAN system, the packets to the terminal equipment of the LAN systems other than the self LAN system are defined for each terminal equipment so as to be transmitted to the communication equipment of the self LAN system connected to the communication equipment on the intermediate network. Those packets are defined to the communication equipment connected to the communication equipment on the intermediate network so as to transfer the packets to the communication equipment on the intermediate network. Thus, a communication between the LAN systems can be realized in the extension of the conventional address schema without changing the address schema of the existing LAN system, without using any special apparatus such as a fire wall or the like, and without limiting a connection which can be simultaneously used.

What is claimed is:

1. A communicating method between LAN systems for establishing communication between a first terminal equipment and a second terminal equipment in a network system comprising a first LAN system having said first terminal equipment, a second LAN system having said second terminal equipment, an intermediate network provided to interface said first and second LAN systems, a first communication equipment to transfer a packet between said first LAN system and said intermediate network, and a second communication equipment to transfer a packet between said intermediate network to said second LAN system, wherein said communicating method comprises the steps of:

defining addresses of terminal equipments of said first and second LAN systems so as to be unique in each of said first LAN system, said second LAN system, and said intermediate network;

transmitting a packet including an address, as a transmission destination address, of a terminal equipment of a transmission destination based on an address definition of said first LAN system from a terminal equipment serving as a transmission source of said first LAN system so as to transmit data from the terminal equipment of said first LAN system to the terminal equipment of said second LAN system;

converting the transmission destination address of said packet into an address of said transmission destination terminal equipment on said intermediate network and transferring the converted address onto said intermediate network by said first communication equipment;

converting the transmission destination address of said packet to the address of said transmission destination terminal equipment on said second LAN system and transferring the converted address to said second LAN system by said second communication equipment; and receiving said packet transferred to said second LAN system on the basis of the address on said second LAN system by said transmission destination terminal equipment on said second LAN system.

2. A method according to claim 1, wherein said defining step further comprises:

setting first mapping information to make an address schema of each LAN system on said first LAN system correspond to an address schema of each LAN system on said intermediate network in said first communication equipment; and setting second mapping information to make an address schema of each LAN system on said second LAN system correspond to the address schema of each LAN system on said intermediate network in said second communication equipment.

3. A method according to claim 2, wherein, in said transferring step by said first communication equipment, the transfer of said packet is executed on the basis of said first mapping information, and in said transferring step by said second communication equipment, the transfer of said packet is executed on the basis of said second mapping information.

4. A network system comprising:

a first LAN system comprising a plurality of terminal equipments;

a second LAN system comprising a plurality of terminal equipments;

an intermediate network provided to interface said first LAN system and said second LAN system;

a first intermediate apparatus for transferring data between said first LAN system and said intermediate network, in which said first intermediate apparatus has first address mapping information to make addresses of the terminal equipments of said first and second LAN systems which are defined on said first LAN system correspond to addresses of the terminal equipments of said first and second LAN systems which are defined on said intermediate network; and a second intermediate apparatus for transferring data between said second LAN system and said intermediate network, in which said second intermediate apparatus has second address mapping information to make addresses of the terminal equipments of said first and second LAN systems which are defined on said second LAN system correspond to the addresses of the terminal equipments of said first and second, LAN systems which are defined on said intermediate network.

5. A system according to claim 4, wherein said first intermediate apparatus converts address information of a data packet which is transferred between said first LAN system and said intermediate network on the basis of said first address mapping information, and wherein said second intermediate apparatus converts address information of a data packet which is transferred between said second LAN system and said intermediate network on the basis of said second address mapping information.

6. A system according to claim 5, wherein:

said first intermediate apparatus includes a first communication equipment which is connected to said first LAN system and a second communication equipment which is connected to said first communication equipment and said intermediate network, and said second intermediate apparatus includes a third communication equipment which is connected to said second LAN system and a fourth communication equipment which is connected to said third communication equipment and said intermediate network.

7. A system according to claim 6, wherein said first address mapping information is stored into said second communication equipment, and wherein said second address mapping information is stored in said fourth communication equipment.

8. A communication method of a distributed network system comprising multiple local networks provided with terminal devices, and an intermediate network provided with communication devices to interface said local networks, said method comprising:

checking, at a source terminal device of a source network, an address of a destination terminal device to determine if the destination terminal is within the source network;

if the destination terminal is not within the source network, transferring data packets from the source terminal device to a communication device installed within the source network;

determining, at the communication device of the source network, the address of the destination terminal device of a destination network, and transferring the data packets to a first communication device provided in the intermediate network to interface the source network;

converting, at the first communication device of the intermediate network, the address of the source terminal device of the source network and the address of the destination terminal device of the destination network into addresses on the intermediate network in accordance with a first mapping table, and transferring the data packets to a second communication device provided in the intermediate network to interface the destination network in accordance with converted addresses on the intermediate network;

converting, at the second communication device of the intermediate network, the converted addresses on the intermediate network back into the address of the source terminal device of the source network and the address of the destination terminal device of the destination network in accordance with a second mapping table, and transferring the data packets to a communication device installed within the destination network; and transferring the data packets, at the communication device of the destination network, to the destination terminal device of the destination network.

9. A method according to claim 8, further comprising the step of establishing, if the destination terminal device is within the source network, mutual connection between the source terminal device and the destination terminal device installed within the same network using IP/TCP.

10. A method according to claim 8, wherein said terminal devices correspond to personal computers and/or servers, and said communication devices correspond to routers or gateways.

* * * * *